(12) United States Patent
Nagae (10) Patent No.: US 10,604,116 B2
(45) Date of Patent: Mar. 31, 2020

(54) WINDOW GLASS HEATING APPARATUS (71) Applicant: TOYOTA JIDOSHA KABUSHIKI KAISHA, Toyota (JP)

(72) Inventor: Hajime Nagae, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 309 days.

(21) Appl. No.: 15/419,253

(22) Filed: Jan. 30, 2017

(65) Prior Publication Data

US 2017/0247019 A1  Aug. 31, 2017

(30) Foreign Application Priority Data

Feb. 29, 2016 (JP) .................................. 2016-037016

(51) Int. Cl.
*B60S 1/02* (2006.01)
*H05B 1/02* (2006.01)
*H05B 3/86* (2006.01)

(52) U.S. Cl.
CPC ............ *B60S 1/026* (2013.01); *H05B 1/0236* (2013.01); *H05B 3/86* (2013.01)

(58) Field of Classification Search
CPC . B60S 1/023; B60S 1/026; B60S 1/02; H05B 3/86; H05B 3/84; H05B 3/845; H05B 2203/031; H05B 3/0042; H05B 2203/011; H05B 2203/013; H05B 2203/014; H05B 2203/017; H05B 2203/01

See application file for complete search history.

(56) References Cited

U.S. PATENT DOCUMENTS

| 4,985,671 | A | * | 1/1991 | Sauer | H02J 7/1438 219/203 |
| 2016/0001330 | A1 | * | 1/2016 | Romack | B08B 3/02 134/18 |
| 2016/0327006 | A1 | * | 11/2016 | Khafagy | F02N 11/084 |

FOREIGN PATENT DOCUMENTS

| JP | 62-203855 | | 9/1987 |
| JP | 2004-210153 | * | 7/2004 |
| JP | 2006-151285 | | 6/2006 |
| JP | 2009-046028 | | 3/2009 |

* cited by examiner

*Primary Examiner* — Shawntina T Fuqua
(74) *Attorney, Agent, or Firm* — Oblon, McClelland, Maier & Neustadt, L.L.P.

(57) ABSTRACT

The invention relates to a window glass heating apparatus comprising an electric heating wire for heating a window glass of a vehicle. The apparatus continues to stop an energization of the wire until a predetermined energization standby time has elapsed after an energization permission condition becomes satisfied. The apparatus starts the energization of the wire when the predetermined energization standby time has elapsed after the energization permission condition becomes satisfied.

7 Claims, 9 Drawing Sheets

WINDOW GLASS HEATING APPARATUS

BACKGROUND OF THE INVENTION

Field of the invention

The present invention relates to a window glass heating apparatus for heating a window glass of a vehicle to prevent the window glass from being clouded or remove a cloud of the window glass.

Description of the related art

There is known a window glass heating apparatus for heating a window glass of a vehicle to prevent the window glass from being clouded or remove a cloud of the window glass. The window glass heating apparatus has an electric heating wire and a switch operated by a user of the vehicle to start and stop an execution of an energization control for controlling an energization of the electric heating wire. Hereinafter, this window glass heating apparatus will be referred to as "the conventional apparatus".

When the switch is operated by the user of the vehicle while the energization control is not executed, the conventional apparatus starts the execution of the energization control to start the energization of the electric heating wire. Thereafter, the conventional apparatus stops the energization of the electric heating wire when a predetermined time has elapsed after starting the energization of the electric heating wire.

The conventional apparatus determines the predetermined time on the basis of an atmospheric temperature outside of the vehicle, a difference between the atmospheric temperature and a temperature of an interior of the vehicle and the like.

As the atmospheric temperature decreases, a possibility of an occurrence of the cloud of the window glass increases. Thus, for example, the conventional apparatus sets the predetermined time such that the predetermined time increases as the atmospheric temperature decreases (for example, see JP 2004-210153 A).

In general, when the switch is operated while the energization control is not executed, the execution of the energization control is started and at the same time as the start of the execution of the energization control, the energization of the electric heating wire is started. The user of the vehicle operates the switch to start the energization of the electric heating wire when the user wishes to start the energization of the electric heating wire. Thus, it is natural that the energization of the electric heating wire is started at the same time as the operation of the switch. However, when the energization control is built such that the energization of the electric heating wire is started at the same time as the operation of the switch, following problems may arise.

For example, the user of the vehicle may operate the switch to start the execution of the energization control immediately after the user operates the switch to stop the execution of the energization control while the electric heating wire is energized. In this case, if the energization control is built such that the energization of the electric heating wire is started at the same time as the operation of the switch, the energization of the electric heating wire substantially continues although the energization of the electric heating wire is stopped for an extreme short time.

Further, the user of the vehicle may operate the switch to stop the execution of the energization control immediately after the energization of the electric heating wire is stopped and then, the user may operate the switch to start the execution of the energization control immediately after the user operates the switch to stop the execution of the energization control. In this case, also, the energization of the electric heating wire substantially continues with an extreme short energization stop period.

When the energization of the electric heating wire substantially continues with the extreme short energization stop period, temperatures of the electric heating wire, the window glass and the like may increase excessively and thus, a heat deterioration of the electric heating wire, the window glass and the like may occur.

In this connection, if the energization control is built so as not to start the energization of the electric heating wire when the user operates the switch to start the execution of the energization control and the temperatures of the electric heating wire, the window glass and the like detected by temperature sensors are high and then, to start the energization of the electric heating wire when the temperatures of the electric heating wire, the window glass and the like detected by the temperature sensors decrease to a certain temperature, an occurrence of the heat deterioration in the electric heating wire, the window glass and the like can be prevented. In this case, the temperature sensors increase a manufacturing cost of the conventional apparatus.

The present invention has been made for solving the aforementioned problems. An object of the present invention is to provide a window glass heating apparatus configured to start the energization of the electric heating wire when an energization permission condition for permitting the energization of the electric heating wire is satisfied and stop the energization of the electric heating wire when a predetermined time has elapsed after starting the energization of the electric heating wire or when the energization permission condition becomes unsatisfied even before the predetermined time has elapsed, thereby decreasing a possibility of an occurrence of a heat deterioration of the electric heating wire, the window glass and the like with a simple and low cost manner.

SUMMARY OF THE INVENTION

A window glass heating apparatus according to the present invention comprises an electric heating wire (46, 41) for heating a window glass (101) of a vehicle (100) and a control unit (85, 80) configured to control an energization of the electric heating wire (46, 41).

Figure 5:
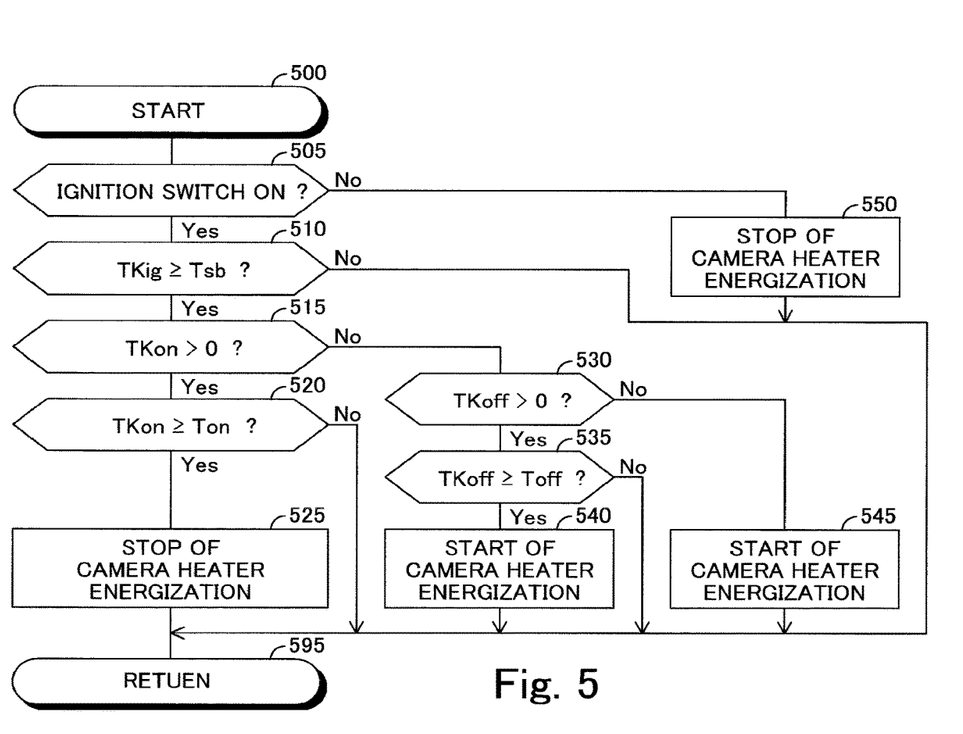
FIG. 5 is a view for showing a flowchart of a camera heater energization control routine according to the first embodiment executed by a CPU of a camera electronic control unit (i.e., a camera ECU) shown in FIG. 2.
Figure 7:
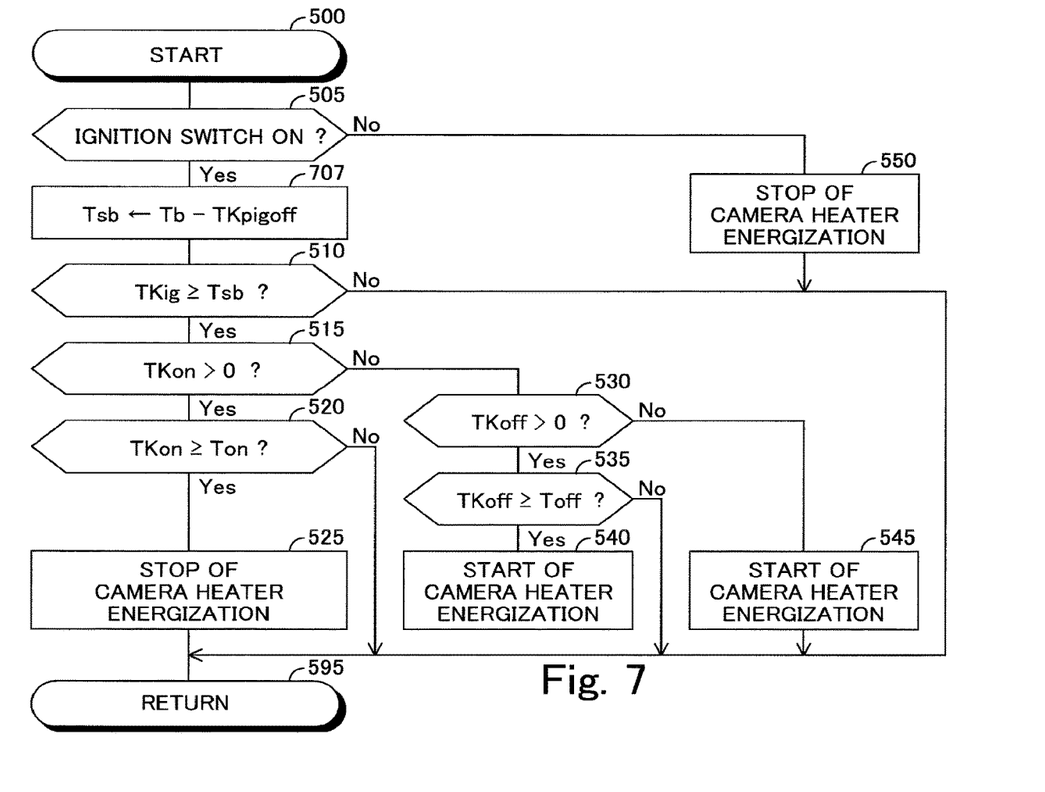
FIG. 7 is a view for showing a flowchart of the camera heater energization control routine according to the second embodiment executed by the CPU of the camera electronic control unit (i.e., the camera ECU) shown in FIG. 2.

The control unit (85, 80) is configured:

to start the energization of the electric heating wire (46, 41) (see processes of steps 540 and 545 of each of FIGS. 5 and 7) while an energization permission condition for permitting the energization of the electric heating wire (46, 41) is satisfied (see a determination "Yes" at a step 505 of each of FIGS. 5 and 7);

to stop the energization of the electric heating wire (46, 41) (see a process of a step 525 of each of FIGS. 5 and 7) when a predetermined energization continuation time (Ton) has elapsed after starting the energization of the electric heating wire (46, 41) while the energization permission condition is satisfied (see a determination "Yes" at a step 520 of each of FIGS. 5 and 7); and to stop the energization of the electric heating wire (46, 41) (see a process of a step 550 of each of FIGS. 5 and 7) when the energization permission condition becomes unsatisfied (a determination "No" at the step 505 of each of FIGS. 5 and 7) even before the predetermined energization continuation time (Ton) has elapsed after starting the energization of the electric heating wire (46, 41).

Further, the control unit (85, 80) is configured:

to continue to stop the energization of the electric heating wire (46, 41) until a predetermined energization standby time (Tsb) has elapsed (see a determination "No" at a step 510 of each of FIGS. 5 and 7) after the energization permission condition becomes satisfied (see the determination "Yes" at the step 505 of each of FIGS. 5 and 7); and to start the energization of the electric heating wire (46, 41) (see the process of the step 545 of each of FIGS. 5 and 7) when the predetermined energization standby time (Tsb) has elapsed (see a determination "Yes" at the step 510 of each of FIGS. 5 and 7) after the energization permission condition becomes satisfied (see the determination "Yes" at the step 505 of each of FIGS. 5 and 7).

The energization permission condition may become satisfied immediately after the energization of the electric heating wire is stopped. In this case, temperatures of the electric heating wire, the window glass and the like may be high when the energization permission condition becomes satisfied. According to the present invention, the energization of the electric heating wire is not started when the energization permission condition becomes satisfied. The energization of the electric heating wire is started when the predetermined energization standby time has elapsed after the energization permission condition becomes satisfied. Therefore, if the temperatures of the electric heating wire, the window glass and the like are high, each of the temperatures decreases to a temperature capable of preventing an occurrence of a heat deterioration in the electric heating wire, the window glass and the like before the predetermined energization standby time has elapsed after the energization permission condition becomes satisfied. Therefore, a possibility that the electric heat deterioration occurs in the electric heating wire, the window glass and the like can be decreased.

The control unit (85, 80) according to an aspect of the present invention may be configured:

to acquire an energization stop time (TKpigoff) elapsing until the energization permission condition becomes satisfied after stopping the energization of the electric heating wire (46, 41); and to set the predetermined energization standby time (Tsb) such that the predetermined energization standby time (Tsb) set when the energization stop time (TKpigoff) is large, is shorter than the predetermined energization standby time (Tsb) set when the energization stop time (TKpigoff) is small (see a process of a step 707 of FIG. 7).

According to this aspect, the energization standby time is set to be long when a time elapsing after stopping the energization of the electric heating wire, is short. Therefore, it is ensured that each of the temperatures of the electric heating wire, the window glass and the like decrease to the temperature capable of preventing the occurrence of the heat deterioration in the electric heating wire, the window glass and the like. Thus, the possibility that the heat deterioration occurs in the electric heating wire, the window glass and the like can be surely decreased.

The control unit (85, 80) according to another aspect of the present invention may be configured:

to perform a start of the energization of the electric heating wire (46, 41) for the predetermined energization continuation time (Ton) (see the process of the step 545 of each of FIGS. 5 and 7) when the predetermined energization standby time (Tsb) has elapsed (see the determination "Yes" at the step 510 of each of FIGS. 5 and 7) after the energization permission condition becomes satisfied (see the determination "Yes" at the step 505 of each of FIGS. 5 and 7);

to perform a stop of the energization of the electric heating wire (46, 41) for a predetermined energization stop time (Toff) (see a determination "Yes" at a step 520, a process of a step 525, a determination "Yes" at a step 530 and a determination "No" at a step 535 of each of FIGS. 5 and 7) when the predetermined energization continuation time (Ton) has elapsed (see the determination "Yes" at the step 520 of each of FIGS. 5 and 7) after performing the start of the energization of the electric heating wire (46, 41) (see the processes of the steps 540 and 545 of each of FIGS. 5 and 7); and to alternately repeatedly perform the start and the stop of the energization of the electric heating wire (46, 41).

In case that the energization of the electric heating wire and the stop of the energization of the electric heating wire are performed alternately repeatedly, the temperatures of the electric heating wire, the window glass and the like may be high when the energization of the electric heating wire is first started. In this case, the temperatures of the electric heating wire, the window glass and the like may continue to be high until the energization permission condition becomes unsatisfied. Thereby, the heat deterioration is likely to occur in the electric heating wire, the window glass and the like. According to this another aspect, the energization of the electric heating wire continues to be stopped until the energization standby time has elapsed after the energization permission condition becomes satisfied. Therefore, the possibility of the occurrence of the heat deterioration in the electric heating wire, the window glass and the like can be decreased.

According to a further aspect of the present invention, when vehicle (100) comprises a camera (30) which takes images of an outside of the vehicle (100) from an interior of the vehicle (100) through the window glass (101), the electric heating wire (46, 41) may be provided such that the electric heating wire (46, 41) heats a portion (101*a*) of the window glass (101) in front of the camera (30).

According to this aspect, the possibility of the occurrence of the cloud in the portion of the window glass in front of the camera.

According to a further aspect of the present invention, when the vehicle (100) comprises a deicer (40, 41) for heating an entirety of the window glass (101) and the camera (30) is supported on the vehicle (100) by a support member (31), the electric heating wire (46) may be mounted on the support member (31) such that the electric heating wire (46) heats a closed space (31*a*) defined by the support member (31), the camera (30) and the window glass (101).

According to this aspect, when the portion of the window glass occurs even if the portion of the window glass in front of the camera is heated by the deicer, the cloud of the portion of the window glass can be removed or the occurrence of the cloud of the portion of the window glass can be prevented by the energization of the electric heating wire. In addition, the space between the camera and the window glass is the closed space and thus, the temperature of the space is likely to be increased by the energization of the electric heating wire. Thus, the cloud of the portion of the window glass in front of the camera can be surely removed or the occurrence of the cloud of the portion of the window glass in front of the camera can be surely prevented.

According to a further aspect of the present invention, when the vehicle (100) comprises a vehicle starting switch (20) for selectively setting the vehicle (100) at any of a vehicle travel state that the vehicle (100) can travel and a vehicle non-travel state that the vehicle (100) cannot travel, the vehicle starting switch (20) being operated by a user of the vehicle (100), the energization permission condition may become satisfied when the vehicle starting switch (20) is operated to set the vehicle (100) at the vehicle travel state and the energization permission condition may become unsatisfied when the vehicle starting switch (20) is operated to set the vehicle (100) at the vehicle non-travel state.

According to this aspect, the user of the vehicle can switch the energization permission condition between a state that the energization permission condition is satisfied and a state that the energization permission condition is unsatisfied. Thus, the energization permission condition may become satisfied immediately after the energization permission condition becomes unsatisfied. In this case, according to this aspect, the energization of the electric heating wire continues to be stopped until the predetermined energization standby time has elapsed after the energization permission condition is satisfied. Therefore, the possibility of the occurrence of the heat deterioration in the electric heating wire, the window glass and the like can be decreased.

According to a further aspect of the present invention, when the vehicle (100) comprises an internal combustion engine (10) as a driving source for driving the vehicle (100), the control unit (85, 80) may be configured to execute an engine operation control for:

stopping an operation of the internal combustion engine (10) when a predetermined engine operation stop condition becomes satisfied while the internal combustion engine (10) is operated; and restarting the operation of the internal combustion engine (10) when a predetermined engine operation restart condition becomes satisfied while the operation of the internal combustion engine (10) is stopped.

In this case, the energization permission condition becomes satisfied when the operation of the internal combustion engine (10) is restarted by the engine operation control and the energization permission condition becomes unsatisfied when the operation of the internal combustion engine (10) is stopped by the engine operation control.

In the engine according to this aspect, the operation of the engine may be restarted immediately after the operation of the engine is stopped and thereby, the energization permission condition may become satisfied immediately after the energization permission condition becomes unsatisfied. According to this aspect, the energization of the electric heating wire continues to be stopped until the predetermined energization standby time has elapsed after the energization permission condition becomes satisfied. Therefore, the possibility of the occurrence of the heat deterioration in the electric heating wire, the window glass and the like can be decreased.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE PREFERRED EMBODIMENTS

Figure 1A:
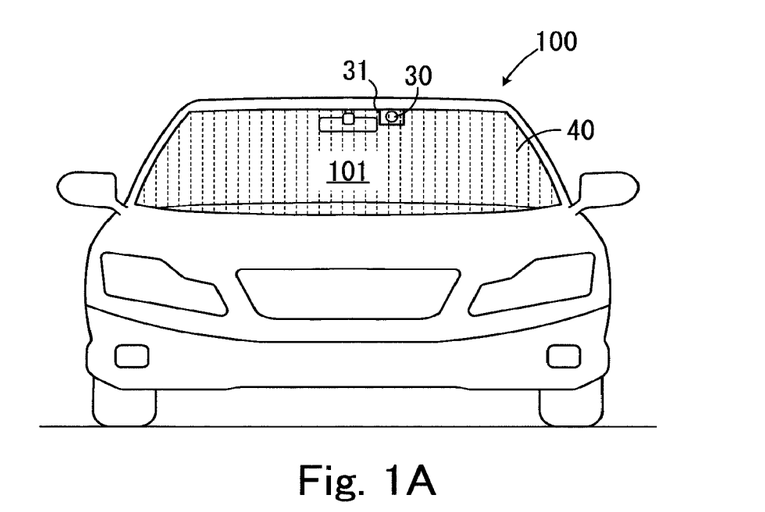
FIG. 1A is a front view for showing a vehicle provided with a camera heater (i.e., a window glass heating apparatus) according to an embodiment of the present invention.
Figure 1B:
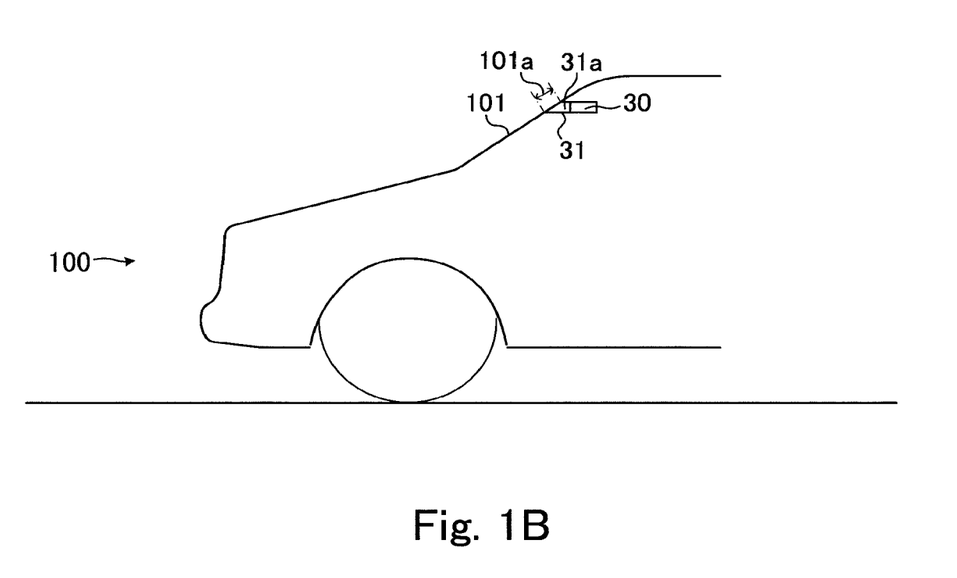
FIG. 1B is a side view for showing the vehicle shown in FIG. 1A.

Below, a window glass heating apparatus according to an embodiment of the present invention will be described with reference to the drawings. The window glass heating apparatus according to the embodiment of the present invention is applied to a vehicle 100 shown in FIG. 1.

Figure 2:
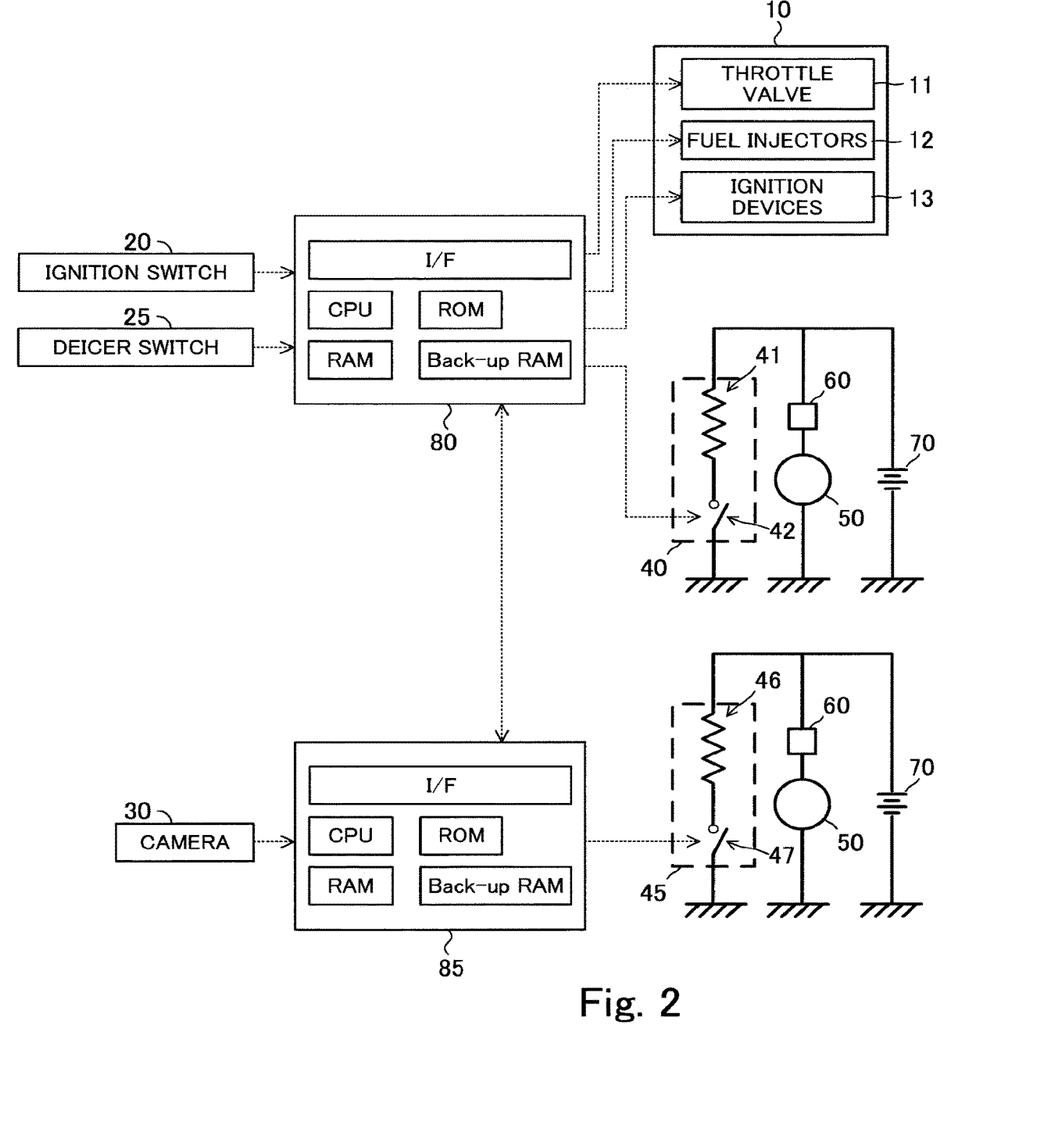
FIG. 2 is a view for showing a system including the camera heater shown in FIG. 1.

As shown in FIGS. 1 and 2, the vehicle 100 has an internal combustion engine 10, an ignition switch 20, a camera 30, a deicer 40 as the window glass heating apparatus, a camera heater 45 as the window glass heating apparatus, an alternator 50, a rectifier 60 and a battery 70.

The engine 10 is a multi-cylinder (in this embodiment, four-cylinder) four-cycle spark-ignition type gasoline engine. As shown in FIG. 2, the engine 10 has a throttle valve 11, fuel injectors 12 and ignition devices 13.

The throttle valve 11 is provided at an intake pipe (not shown) of the engine 10. The throttle valve 11 is electrically connected to a main electronic control unit 80 described later in detail. The main electronic control unit 80 activates the throttle valve 11 such that an opening degree TA of the throttle valve 11 becomes a target value TAtgt. Hereinafter, the main electronic control unit 80 will be referred to as "the main ECU 80".

The fuel injectors 12 are provided such that each of the fuel injectors 12 injects a fuel into a corresponding intake port (not shown) of the engine 10. The fuel injectors 12 are electrically connected to the main ECU 80. The main ECU 80 activates the fuel injectors 12 such that an amount Q of the fuel injected from each of the fuel injectors 12 becomes a target value Qtgt.

The ignition devices 13 are provided such that each of the ignition devices 13 ignites a mixture gas of the fuel and an air formed in a corresponding combustion chamber (not shown) of the engine 10. The ignition devices 13 are electrically connected to the main ECU 80. The main ECU 80 activates the ignition devices 13 such that each of the ignition devices 13 ignites the mixture gas at a predetermined timing.

The ignition switch 20 is operated by a driver (or a user) of the vehicle 100. The ignition switch 20 is electrically connected to the main ECU 80. When the ignition switch 20 is operated to be set at an ON-position by the driver while the engine 10 is not operated, the main ECU 80 starts an operation of the engine 10 and as a result, the vehicle 100 becomes a condition that the vehicle 100 can travel. On the other hand, when the ignition switch 20 is operated to be set on an OFF-position while the engine 10 is operated, the main ECU 80 stops the operation of the engine 10 and as a result, the vehicle 100 becomes a condition that the vehicle 100 cannot travel.

The camera 30 is provided at an interior of the vehicle 100, that is, inside of a front window glass 101 of the vehicle 100. The camera 30 is supported on the vehicle 100 by a bracket 31 (i.e., a support member). The bracket 31 is made of a resin material. Hereinafter, the front window glass 101 will be referred to as "the front glass 101".

The camera 30 takes images of an outside of the vehicle 100 from the interior of the vehicle 100 through the front glass 101. The camera 30 is electrically connected to a camera electronic control device 85 described later in detail. Hereinafter, the camera electronic control unit 85 will be referred to as "the camera ECU 85". Image data of the camera 30 is sent to the camera ECU 85. The camera ECU 85 sends the received image data to the main ECU 80. The main ECU 80 uses the image data received from the camera ECU 85 to execute controls, for example, for maintaining an inter-vehicle distance between the vehicle 100 and a preceding vehicle traveling in front of the vehicle 100 at a predetermined distance.

The camera heater 45 is provided on the bracket 31 such that the camera heater 45 heats a space 31a defined by the bracket 31 in front of the camera 30. In particular, the space 31a is a closed space defined by the camera 30, the bracket 31 and the front glass 101. Therefore, the camera heater 45 is provided at a part of the bracket 31 located between the camera 30 and the front glass 101.

The camera heater 45 has a heater electric heating wire 46 and a heater circuit switch 47. The wire 46 is electrically connected to the alternator 50 through the rectifier 60. The heater circuit switch 47 is electrically connected to the camera ECU 85.

The alternator 50 is connected to a crank shaft (not shown) of the engine 10. The alternator 50 is driven by the engine 10 through the crank shaft when the engine 10 is operated. When the alternator 50 is driven, the alternator 50 generates an electricity.

When the heater circuit switch 47 is set at an ON-position, a part of the electricity generated by the alternator 50 is supplied to the wire 46 through the rectifier 60. That is, the wire 46 is energized. The remaining part of the electricity is charged to the battery 70 through the rectifier 60 or a part of the remaining part of the electricity is supplied to an electric heating wire 41 of the deicer 40 described later in detail through the rectifier 60.

When the wire 46 is energized, a heat generated by the wire 46 heats the space 31a. As a result, a portion 101a of the front glass 101 in front of the camera 30 is heated. Thereby, when the portion 101a of the front glass 101 is clouded by moisture, a cloud of the portion 101a is removed. On the other hand, when the portion 101a is not clouded, the portion 101a is prevented from being clouded.

On the other hand, when the heater circuit switch 47 is set at an OFF-position, the electricity generated by the alternator 50 is not supplied to the wire 46. That is, the energization of the wire 46 is stopped.

As described above, the deicer 40 has the deicer electric heating wire 41 and a deicer circuit switch 42. The deicer electric heating wire 41 is embedded in the front glass 101 throughout the front glass 101. The deicer electric heating wire 41 is electrically connected to the alternator 50 through the rectifier 60. The deicer circuit switch 42 is electrically connected to the main ECU 80.

When the deicer switch 25 is operated to be set at an ON-position by the driver of the vehicle, the main ECU 80 sets the deicer circuit switch 42 at an ON-position. When the deicer circuit switch 42 is set at an ON-position, a part of the electricity generated by the alternator 50 is supplied to the deicer electric heating wire 41 through the rectifier 60. That is, the deicer electric heating wire 41 is energized.

When the deicer electric heating wire 41 is energized, a heat generated by the deicer electric heating wire 41 heats an entirety of the front glass 101. Thereby, when the front glass 101 is clouded by the moisture, the cloud of the front glass 101 is removed. On the other hand, when the front glass 101 is not clouded, the front glass 101 is prevented from being clouded.

On the other hand, when the main ECU 80 sets the deicer circuit switch 42 at an OFF-position as described later, no electricity is supplied to the deicer electric heating wire 41. That is, the energization of the deicer electric heating wire 41 is stopped.

The main ECU 80 as a control section is an electronic circuit including a known microcomputer and includes a CPU, a ROM, a RAM, a back-up RAM, an interface and the like.

When the ignition switch 20 is set at the ON-position, the main ECU 80 activates the throttle valve 11, the fuel injectors 12 and the ignition devices 13 to start the operation of the engine 10 in response to a signal sent from the ignition switch 20. On the other hand, when the ignition switch 20 is set at the OFF-position, the main ECU 80 stops activations of the throttle valve 11, the fuel injectors 12 and the ignition devices 13 to stop the operation of the engine 10 in response to the signal sent from the ignition switch 20.

As described above, the main ECU 80 sets the deicer circuit switch 42 at any of the ON- and OFF-positions.

The camera ECU 85 as the control section is an electronic circuit including a known microcomputer and includes a CPU, a ROM, a RAM, a back-up RAM, an interface and the like.

The camera ECU 85 sets the heater circuit switch 47 at any of the ON- and OFF-positions. As described above, when the camera ECU 85 sets the heater circuit switch 47 at the ON-position while the engine 10 is operated, the heater electric heating wire 46 is energized. On the other hand, when the camera ECU 85 sets the heater circuit switch 47 at the OFF-position, an energization of the wire 46 is stopped.

<Summary of Operation of Deicer>

Next, a summary of an operation of the deicer 40 will be described. When the deicer switch 25 is set at the ON-position by the driver of the vehicle 100, the main ECU 80 sets the deicer circuit switch 42 at the ON-position. Thereby, the electricity is supplied to the deicer electric heating wire 41, that is, the deicer electric heating wire 41 is energized and as a result, the front glass 101 is heated by the deicer electric heating wire 41.

Thereafter, the main ECU 80 acquires a time Td elapsing after starting an energization of the deicer electric heating wire 41 as an elapsed time Td. When the elapsed time Td reaches a predetermined time Tdth, the main ECU 80 sets the deicer circuit switch 42 at the OFF-position. Thereby, a supply of the electricity to the deicer electric heating wire 41, that is, the energization of the deicer electric heating wire 41 is stopped.

<Summary of Operation of Camera Heater according to First Embodiment>

Next, a summary of an operation of the camera heater 45 according to a first embodiment will be described. When the ignition switch 20 is set at the ON-position, an energization permission condition for permitting an energization of the heater electric heating wire 46 is satisfied. When the energization permission condition is satisfied, the camera ECU 85 performs the energization of the wire 46 for a predetermined energization continuation time Ton and a stop of the energization of the wire 46 for a predetermined energization stop time Toff repeatedly.

In this regard, the camera ECU 85 does not start the energization of the wire 46, that is, continues to stop the energization of the wire 46 until a predetermined energization standby time Tsb has elapsed after the ignition switch 20 is sets at the ON-position and the energization permission condition is satisfied. Then, when the predetermined energization standby time Tsb has elapsed, the camera ECU 85 sets the heater circuit switch 47 at the ON-position to start the energization of the wire 46. Thereafter, while the ignition switch 20 is set at the ON-position, the camera ECU 85 performs the energization of the wire 46 for the predetermined energization continuation time Ton and the stop of the energization of the wire 46 for the predetermined energization stop time Toff repeatedly.

The predetermined energization standby time Tsb is set to a time sufficient for decreasing each of temperatures of parts heated by the wire 46 to a temperature capable of preventing the temperatures of the parts from being increased excessively due to a heat generated by the wire 46 after the predetermined energization standby time Tsb has elapsed and the energization of the wire 46 is started. The parts include the bracket 31 and the front glass 101 around the camera heater 45 and parts of the camera heater 45 and hereinafter, will be referred to as "the heated parts".

The predetermined energization continuation time Ton is set to a time sufficient for removing the cloud of the portion 101*a* of the front glass 101 in front of the camera 30 and preventing the portion 101*a* from being clouded.

The predetermined energization stop time Toff is set to a time sufficient for decreasing each of the temperatures of the heated parts to a temperature capable of preventing the temperatures of the heated parts from being increased excessively due to the energization of the heater electric heating wire 46 for the predetermined energization continuation time Ton.

In the first embodiment, the predetermined energization stop time Toff is set to the same time as the predetermined energization continuation time Ton and the predetermined energization standby time Tsb is set to a time smaller than the predetermined energization stop time Toff. For example, when the predetermined energization stop and continuation times Toff and Ton are set to two to three minutes, respectively, the predetermined energization standby time Tsb is set to about thirty seconds.

On the other hand, when the ignition switch 20 is set at the OFF-position and as a result, the energization permission condition becomes unsatisfied, the camera ECU 85 sets the heater circuit switch 47 at the OFF-position to stop the energization of the heater electric heating wire 46.

Figure 3A:
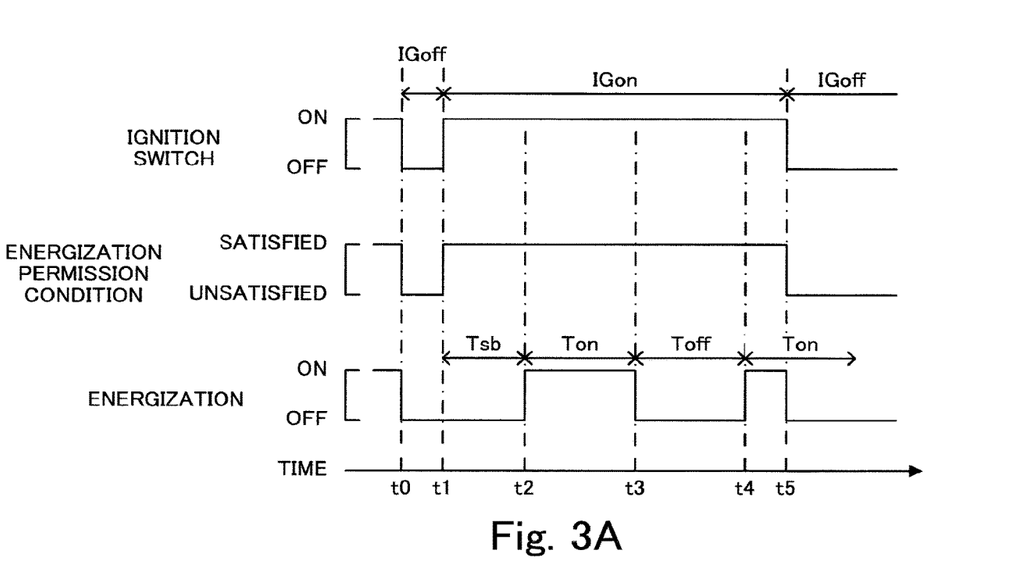
FIG. 3A is a view for showing a time chart used for describing an operation of the camera heater according to a first embodiment of the present invention.

Thereby, for example, when the ignition switch 20 is operated as shown in FIG. 3A, the energization of the wire 46 is controlled as described below. In an example shown in FIG. 3A, at a time t0, the ignition switch 20 is set at the OFF-position. Thereafter, at a time t1, the ignition switch 20 is set at the ON-position. Thereafter, at a time t5, the ignition switch 20 is set at the OFF-position.

In this case, at the time t0, the energization permission condition becomes unsatisfied and as a result, the wire 46 is not energized. Then, at the time t1 immediately after the time t0, the energization permission condition becomes satisfied. However, at the time t1, the energization of the wire 46 is not started.

Thereafter, at a time t2 that the predetermined energization standby time Tsb has elapsed after the time t1 that the energization permission condition becomes satisfied, the energization of the wire 46 is started. Thereafter, at a time t3 that the predetermined energization continuation time Ton has elapsed from the time t2 that the energization of the wire 46 is started, the energization of the wire 46 is stopped. Thereafter, at a time t4 that the predetermined energization stop time Toff has elapsed after the time t3 that the energization of the wire 46 is stopped, the energization of the wire 46 is restarted. Thereafter, while the energization permission condition is satisfied, the energization of the wire 46 for the predetermined energization continuation time Ton and the stop of the energization of the wire 46 for the predetermined energization stop time Toff are performed alternately repeatedly.

When the ignition switch 20 is set at the OFF-position at the time t5, the energization permission condition becomes unsatisfied and thus, the energization of the wire 46 is stopped.

Figure 3B:
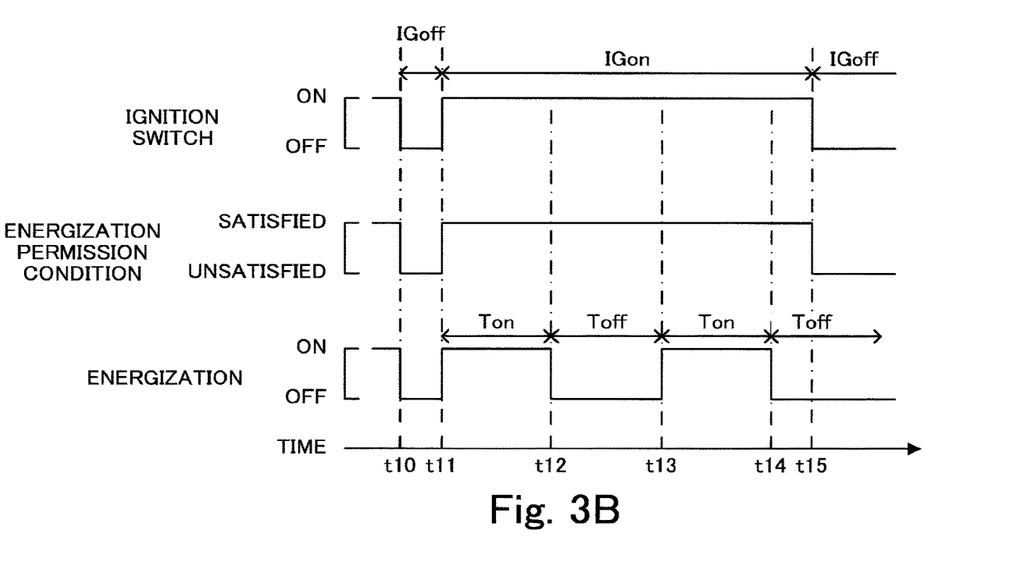
FIG. 3B is a view for showing a time chart used for describing an operation different from the operation of the camera heater according to the first embodiment.

According to the energization control with respect to the wire 46, as shown in FIG. 3B, a possibility that a heat deterioration occurs in the heated parts decreases, compared with a case that the energization of the wire 46 is controlled as shown in FIG. 3B.

In an example shown in FIG. 3B, similar to the example shown in FIG. 3A, at a time t10, the ignition switch 20 is set to the OFF-position. At a time t11 immediately after the time t10, the ignition switch 20 is set at the ON-position. Thereafter, at a time t15, the ignition switch 20 is set at the OFF-position.

In the example shown in FIG. 3B, at the time 11 that the ignition switch 20 is set at the ON-position and thereby, the satisfaction of the energization permission condition, the energization of the heater electric heating wire 46 is started. In this case, the wire 46 has not been energized for a short time from the time t10 that the energization permission condition becomes unsatisfied to the time t11 that the energization permission condition becomes satisfied. Thus, when the temperatures of the heated parts are high at the time t10, the temperatures of the heated parts are likely to be increased excessively by the energization of the wire 46 which is started at the time t11. Therefore, the heat deterioration is likely to occur in the heated parts.

On the other hand, according to the energization control with respect to the wire 46 according to the first embodiment, the energization of the wire 46 is not started until the predetermined energization standby time Tsb has elapsed from the time t1 that the energization permission condition becomes satisfied. Therefore, if the temperatures of the heated parts are high at the time t0 that the energization permission condition becomes unsatisfied, the temperatures of the heated parts decrease sufficiently before the predetermined energization standby time Tsb has elapsed. Thus, the energization of the wire 46 started at the time t2 that the predetermined energization standby time Tsb has elapsed, is unlikely to increase the temperatures of the heated parts excessively. Therefore, the heat deterioration is unlikely to occur in the heated parts.

<Concrete Operation of Deicer>

Next, a concrete operation of the deicer 40 will be described. The CPU of the main ECU 80 is configured or programmed to execute a routine shown in FIG. 4 by a flowchart each time a predetermined time elapses. Hereinafter, the CPU of the main ECU 80 will be referred to as "the main CPU". At a predetermined timing, the main CPU starts a process from a step 400 and then, proceeds with the process to a step 410 to determine whether or not the energization of the deicer 40 is stopped.

Figure 4:
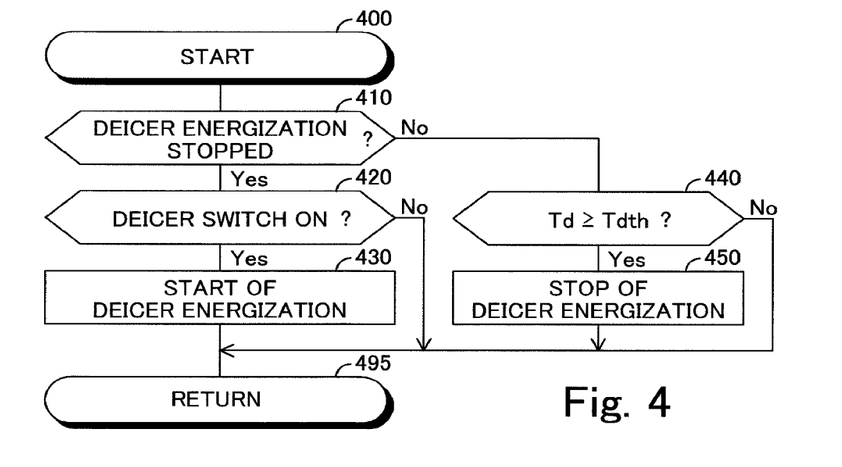
FIG. 4 is a view for showing a flowchart of a routine executed by a CPU of a main electronic control unit (i.e., a main ECU) shown in FIG. 2.

Now, assuming that the energization of the deicer 40 is stopped, the main CPU determines "Yes" at the step 410 and then, proceeds with the process to a step 420 to determine whether or not the deicer switch 25 is set at the ON-position.

When the deicer switch 25 is not set at the ON-position, the main CPU determines "No" at the step 420 and then, proceeds with the process directly to a step 495 to terminate an execution of this routine once. In this case, the energization of the deicer 40 is continued to be stopped.

On the other hand, when the deicer switch 25 is set at the ON-position, the main CPU determines "Yes" at the step 420 and then, proceeds with the process to a step 430 to start the energization of the deicer 40. Then, the main CPU proceeds with the process to the step 495 to terminate the execution of this routine once.

When the main CPU proceeds with the process to the step 410 after the energization of the deicer 40 is started, the main CPU determines "No" at the step 410 and then, proceeds with the process to a step 440 to determine whether or not the elapsed time Td elapsing after starting the energization of the deicer 40 reaches the predetermined time Tdth.

When the elapsed time Td reaches the predetermined time Tdth, the main CPU determines "Yes" at the step 440 and then, proceeds with the process to a step 450 to stop the energization of the deicer 40. Thereafter, the main CPU proceeds with the process to the step 495 to terminate the execution of this routine once. Thereby, when the deicer 40 is energized for the predetermine time Tdth, the energization of the deicer 40 is stopped.

On the other hand, when the elapsed time Td does not reach the predetermined time Tdth, the main CPU determines "No" at the step 440 and then, proceeds with the process directly to the step 495 to terminate the execution of this routine once. In this case, the energization of the deicer 40 continues. The concrete operation of the deicer 40 has been described.

<Concrete Operation of Camera Heater according to First Embodiment>

Next, a concrete operation of the camera heater 45 according to the first embodiment will be described. The CPU of the camera ECU 85 is configured or programmed to execute a routine shown by a flowchart in FIG. 5 each time a predetermined time elapses. Hereinafter, the CPU of the camera ECU 85 will be referred to as "the camera CPU". At a predetermined timing, the camera CPU starts a process from a step 500 and then, proceeds with the process to a step 505 to determine whether or not the ignition switch 20 is set at the ON-position.

When the ignition switch 20 is set at the ON-position, the camera CPU determines "Yes" at the step 505 and then, proceeds with the process to a step 510 to determine whether or not a time TKig elapsing after the ignition switch 20 is set at the ON-position is equal to or larger than the predetermined energization standby time Tsb. Hereinafter, the time TKig will be referred to as "the elapsed time TKig".

Assuming that the present time is a time immediately after the ignition switch 20 is set at the ON-position, the elapsed time TKig is smaller than the predetermined energization standby time Tsb. In this case, the camera CPU determines "No" at the step 510 and then, proceeds with the process to a step 595 to terminate an execution of this routine once. In this case, the energization of the heater electric heating wire 46 is not started and the energization of the wire 46 continues to be stopped until the elapsed time TKig reaches the predetermined energization standby time Tsb.

When the elapsed time TKig becomes equal to or larger than the predetermined energization standby time Tsb, the camera CPU determines "Yes" at the step 510 and then, proceeds with the process to a step 515 to determine whether or not the elapsed time TKon elapsing after starting the energization of the heater electric heating wire 46 is larger than zero. Hereinafter, the time TKon will be referred to as "the elapsed time TKon".

Assuming that the present time is a time immediately after the elapsed time TKig becomes equal to or larger than the predetermined energization standby time Tsb, the energization of the heater electric heating wire 46 is not started and thus, the elapsed time TKon is zero. In this case, the camera CPU determines "No" at the step 515 and then, proceeds with the process to a step 530 to determine whether or not the time TKoff elapsing after stopping the energization of the wire 46 is larger than zero.

The present time is the time immediately after the elapsed time TKig becomes equal to or larger than the predetermined energization standby time Tsb and thus, the elapsed time TKoff is zero. Therefore, the camera CPU determines "No" at the step 530 and then, proceeds with the process to a step 545 to start the energization of the heater electric heating wire 46. Thereafter, the camera CPU proceeds with the process to the step 595 to terminate the execution of this routine once.

Immediately after the elapsed time TKig becomes equal to or larger than the predetermined energization standby time Tsb after the ignition switch 20 is set at the ON-position, the energization of the heater electric heating wire 46 is not started and continues to be stopped. Thus, both of the elapsed times TKon and TKoff are zero, respectively. Therefore, immediately after the elapsed time TKig becomes equal to or larger than the predetermined energization standby time Tsb, the camera CPU determines "No" at the steps 515 and 530, respectively and then, proceeds with the process to the step 545 to start the energization of the wire 46.

When the camera CPU executes the process of the step 545 to start the energization of the wire 46, the elapsed time TKon becomes larger than zero. Therefore, the camera CPU determines "Yes" at the step 515 and then, proceeds with the process to a step 520 to determine whether or not the elapsed time TKon is equal to or larger than the predetermined energization continuation time Ton.

The camera CPU determines "No" at the step 520 until the elapsed time TKon reaches the predetermined energization continuation time Ton and then, proceeds with the process to the step 595 to terminate the execution of this routine once. Therefore, the energization of the heater electric heating wire 46 continues.

When the elapsed time TKon becomes equal to or larger than the predetermined energization continuation time Ton, the camera CPU determines "Yes" at the step 520 and then, proceeds with the process to a step 525 to stop the energization of the wire 46. Thereafter, the camera CPU proceeds with the process to the step 595 to terminate the execution of this routine once.

When the camera CPU executes the process of the step 525 to stop the energization of the wire 46, the elapsed time TKoff becomes larger than zero. On the other hand, the elapsed time TKon becomes zero. Therefore, the camera CPU determines "No" at the step 515 and then, determines "Yes" at the step 530. Thus, the camera CPU proceeds with the process to a step 535 to determine whether or not the elapsed time TKoff is equal to or larger than the predetermined energization stop time Toff.

The camera CPU determines "No" at the step 535 until the elapsed time TKoff reaches the predetermined energization stop time Toff and then, proceeds with the process directly to the step 595 to terminate the execution of this routine once. Therefore, the energization of the heater electric heating wire 46 continues to be stopped.

When the elapsed time TKoff is equal to or larger than the predetermined energization stop time Toff, the camera CPU determines "Yes" at the step 535 and then, proceeds with the process to a step 540 to start the energization of the wire 46. Thereafter, the camera CPU proceeds with the process to the step 595 to terminate the execution of this routine once.

When the ignition switch 20 is set at the OFF-position upon the execution of the process of the step 505, the camera CPU determines "No" at the step 505 and then, proceeds with the process to a step 550 to stop the energization of the wire 46 if the wire 46 is energized.

The concrete operation of the camera heater 45 has been described. According to the operation of the camera heater 45, the cloud of the portion 101a of the front glass 101 can be removed or the portion 101a of the front glass 101 can be prevented from being clouded while the possibility of the occurrence of the heat deterioration of the heated parts can be prevented.

<Summary of Operation of Camera Heater according to Second Embodiment>

Next, a summary of the operation of the camera heater 45 according to a second embodiment will be described. In the second embodiment, similar to the first embodiment, when the ignition switch 20 is set at the ON-position, the energization permission condition for permitting the energization of the heater electric heating wire 46 is satisfied. When the energization permission condition is satisfied, the camera CPU performs the energization of the wire 46 for the predetermined energization continuation time Ton and the stop of the energization of the wire 46 for the predetermined energization stop time Toff repeatedly.

The camera ECU 85 continues to stop the energization of the wire 46 without starting the energization of the wire 46 until the predetermined energization standby time Tsb has elapsed after the ignition switch 20 is set at the ON-position to satisfy the energization permission condition.

In the second embodiment, the camera ECU 85 starts a measurement of a time Tpigoff elapsing after stopping the energization of the wire 46 each time the camera ECU 85 stops the energization of the wire 46 while the energization permission condition is satisfied. When the ignition switch 20 is set at the ON-position and thereby, the energization permission condition is satisfied, the camera ECU 85 acquires the time Tpigoff elapsing after stopping the energization of the wire 46 last time. Hereinafter, the time Tpigoff will be referred to as "the elapsed time Tpigoff".

The camera ECU 85 has stored a time capable of decreasing the temperature of the heated parts to a temperature capable of preventing the heat deterioration of the heated parts by stopping the energization of the heater electric heating wire 46 as a base energization stop time Tb in the ROM of the camera ECU 85. The camera ECU 85 sets a value obtained by subtracting the acquired elapsed time Tpigoff from the base energization stop time Tb as the predetermined energization standby time Tsb (Tsb=Tb−Tpigoff).

Similar to the first embodiment, at a time of the predetermined energization standby time Tsb having elapsed after the ignition switch 20 is set at the ON-position, the camera ECU 85 sets the heater circuit switch 47 at the ON-position to start the energization of the heater electric heating wire 46. Thereafter, the camera ECU 85 performs the energization of the wire 46 for the predetermined energization continuation time Ton and the stop of the energization of the wire 46 for the predetermined energization stop time Toff repeatedly while the ignition switch 20 is set at the ON-position.

On the other hand, when the ignition switch 20 is set on the OFF-position and as a result, the energization permission condition becomes unsatisfied, the camera ECU 85 sets the heater circuit switch 47 at the OFF-position to stop the energization of the heater electric heating wire 46.

Figure 6A:
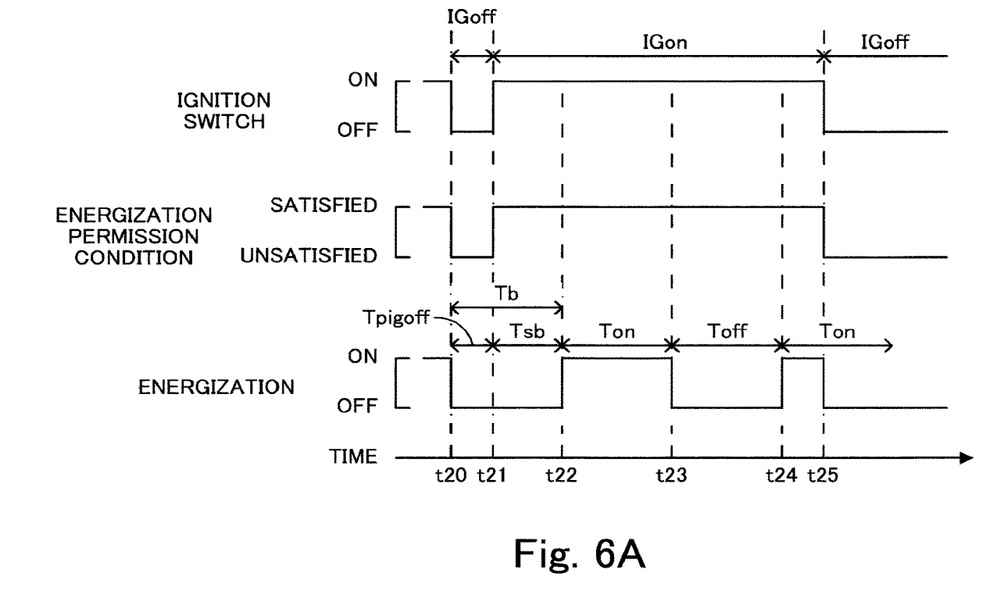
FIG. 6A is a view for showing a time chart used for describing an example of the operation of the camera heater according to a second embodiment of the present invention.

Thereby, for example, when the ignition switch 20 is operated as shown in FIG. 6A, the energization of the wire 46 is controlled as follows. That is, in an example shown in FIG. 6A, at a time t20, the ignition switch 20 is set at the OFF-position. At a time t21 immediately after the time t20, the ignition switch 20 is set at the ON-position. Thereafter, at a time t25, the ignition switch 20 is set at the OFF-position.

In this case, at the time t20, the energization permission condition becomes unsatisfied and as a result, the energization of the heater electric heating wire 46 is stopped. Then, at the time t21 immediately after the time t20, the energization permission condition becomes satisfied. At the time t21, the energization of the wire 46 is not started.

Thereafter, at a time t22 that the predetermined energization standby time Tsb has elapsed after the time t21 that the energization permission condition becomes satisfied, the energization of the wire 46 is started. As described above, the predetermined energization standby time Tsb is set to a time obtained by subtracting the time Tpigoff from the base energization stop time Tb, the time Tpigoff being a time elapsing until the time t21 that the ignition switch 20 is set at the ON-position after the time t20 that the energization of the wire 46 is stopped.

Thereafter, at a time t23 that the predetermined energization continuation time Ton has elapsed after the time t22 that the energization of the wire 46 is started, the energization of the wire 46 is stopped. Thereafter, at a time t24 that the predetermined energization stop time Toff has elapsed after the time t23 that the energization of the wire 46 is stopped, the energization of the wire 46 is restarted. Thereafter, while the energization permission condition is satisfied, the energization of the wire 46 for the predetermined energization continuation time Ton and the stop of the energization of the wire 46 for the predetermined energization stop time Toff are performed repeatedly.

When the ignition switch 20 is set to the OFF-position at a time t25, the energization permission condition becomes unsatisfied and thus, the energization of the wire 46 is stopped.

Figure 6B:
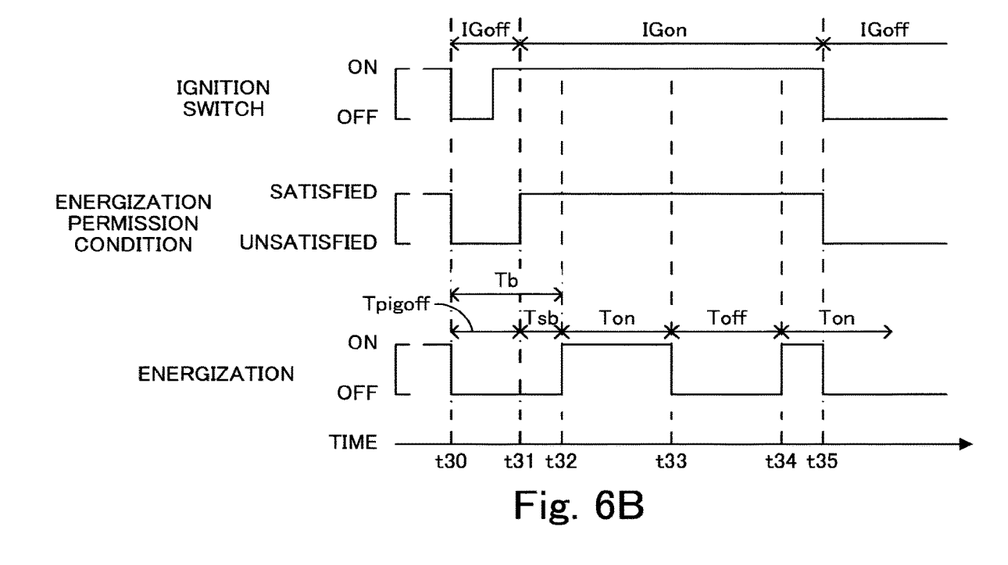
FIG. 6B is a view for showing a time chart used for describing another example of the operation of the camera heater according to the second embodiment.

On the other hand, an example shown in FIG. 6B is different from the example shown in FIG. 6A in that the elapsed time Tpigoff of the example shown in FIG. 6B is longer than the elapsed time Tpigoff of the example shown in FIG. 6A. The elapsed time Tpigoff of the example shown in FIG. 6B is a time elapsing until a time t31 that the ignition switch 20 is set at the ON-position after a time t30 that the ignition switch 20 is set to the OFF-position and thereby, the energization of the heater electric heating wire 46 is stopped.

When the elapsed time Tpigoff increases as in the example shown in FIG. 6B, the predetermined energization standby time Tsb is set to a time shorter than the predetermined energization standby time Tsb of the example shown in FIG. 6A such that the time Ttotal elapsing until a time t32 that the energization of the wire 46 is started after the time t30 that the energization of the wire 46 is stopped, corresponds to the base energization stop time Tb.

Thereby, as the time TKpigoff elapsing until the ignition switch 20 is set at the ON-position after the energization of the wire 46 is stopped, decreases, that is, as the time TKpigoff elapsing until the energization permission condition becomes satisfied after the energization of the wire 46 is stopped, decreases, the base energization stop time Tb increases. As a result, independently of the time Tpgoff elapsing until the ignition switch 20 is set at the ON-position after the energization of the wire 46 is stopped, the time TKtotal (=TKpigoff+Tsb) elapsing until the energization of the wire 46 is started after the energization of the wire 46 is stopped corresponds to the constant base energization stop time Tb.

Therefore, the temperature of the heated parts decreases surely to a temperature capable of preventing the heat deterioration of the heated parts by setting the base energization stop time Tb to a suitable time until the energization of the wire 46 is started after the ignition switch 20 is set at the ON-position. Thus, the cloud of the portion 101a of the front glass 101 can be removed or the portion 101a of the front glass 101 can be prevented from being clouded while the possibility of the occurrence of the heat deterioration in the heated parts can be surely decreased.

<Concrete Operation of Camera Heater according to Second Embodiment>

Next, a concrete operation of the camera heater 45 according to the second embodiment will be described. The camera CPU is configured or programmed to execute a routine shown by a flowchart in FIG. 7 each time a predetermined time elapses. Steps 500, 505 and 510 to 550 in the routine shown in FIG. 7 are the same as the steps 500, 505 and 510 to 550 in the routine shown in FIG. 6, respectively. In other words, in FIG. 7, a step 707 is added to the routine shown in FIG. 6. Thus, below, a process of the step 707 will be mainly described.

When the ignition switch 20 is set at the ON-position upon the execution of the process of the step 505, the camera CPU determines "Yes" at the step 505 and then, proceeds with the process to the step 707.

When the camera CPU proceeds with the process to the step 707, the camera CPU subtracts the TKpigoff from the base energization stop time Tb to calculate or set the predetermined energization standby time Tsb (=Tb−TKpgioff). Thereafter, the camera CPU proceeds with the process to the step 510 to determine whether or not the time TKig elapsing after the ignition switch 20 is set at the ON-position is equal to or larger than the predetermined energization standby time Tsb calculated at the step 707.

Thereby, as the time TKpigoff elapsing until the ignition switch 20 is set at the ON-position after the energization of the heater electric heating wire 46 is stopped, decreases, that is, as the time TKpigoff elapsing until the energization permission condition becomes satisfied after the energization of the wire 46 is stopped, decreases, the predetermined energization standby time Tsb increases. Thus, as described above, the cloud of the portion 101a of the front glass 101 can be removed or the portion 101a of the front glass 101 can be prevented from being clouded while the possibility of the occurrence of the heat deterioration in the heated parts can be surely decreased.

It should be noted that the present invention is not limited to the aforementioned embodiment and various modifications can be employed within the scope of the present invention.

For example, the camera ECU 85 may be configured to:
continue to stop the energization of the heater electric heating wire 46 for the predetermined energization standby time Tsb after the energization permission condition becomes satisfied;
energize the wire 46 for the predetermined energization continuation time Ton after the predetermined energization standby time Tsb has elapsed; and
stop the energization of the wire 46 when the predetermined energization continuation time Ton has elapsed without alternately repeatedly performing the energization of the wire 46 for the predetermined energization continuation time Ton and the stop of the energization of the wire 46 for the predetermined energization stop time Toff while the energization permission condition is satisfied.

The predetermined energization continuation time Ton and the predetermined energization stop time Toff may be the same as each other. Alternatively, the predetermined energization continuation time Ton and the predetermined energization stop time Toff may be different from each other.

Figure 8:
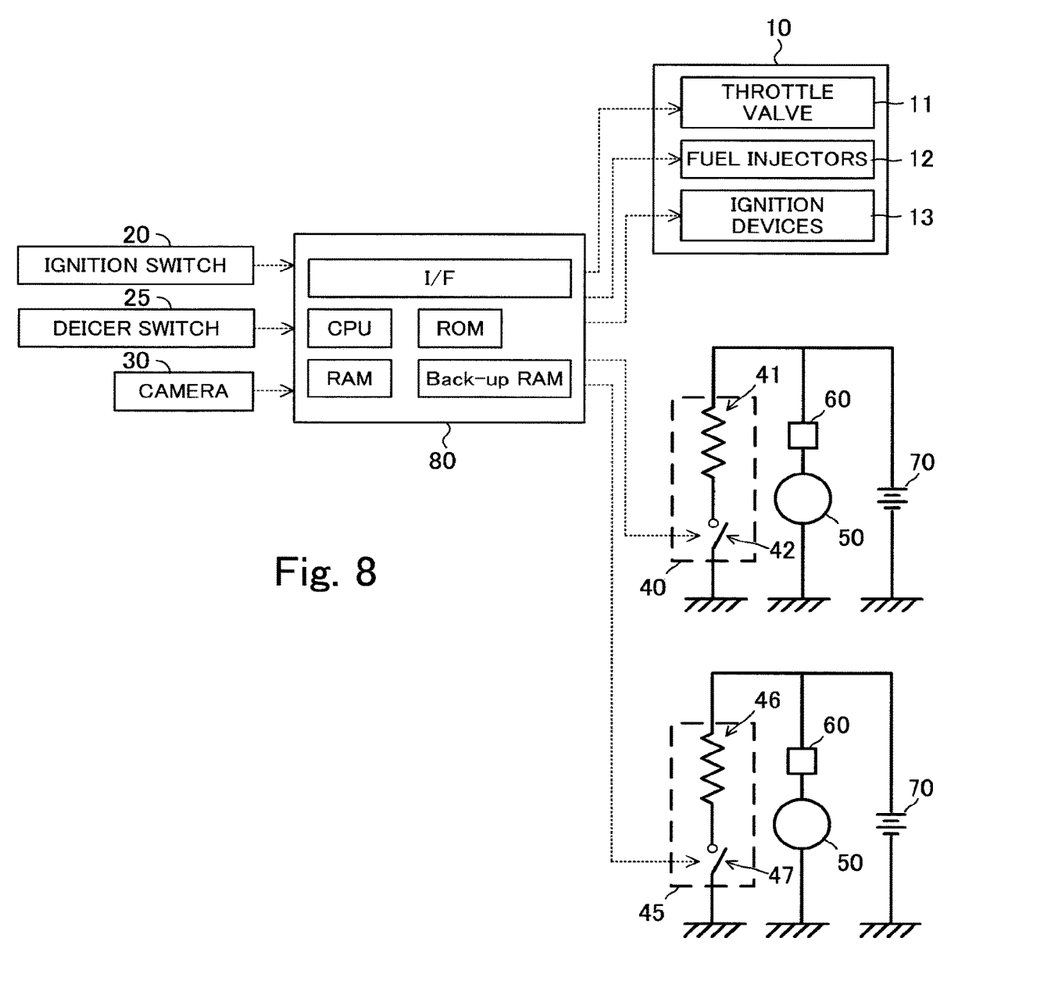
FIG. 8 is a view for showing one of systems, to which the present invention can be applied.

The control of the camera heater 45 according to each of the first and second embodiments can be applied to the control of the deicer 40. Further, as shown in FIG. 8, the control of the camera heater 45 according to each of the embodiments can be applied to a case that the vehicle 100 does not has the camera ECU 85 and the camera heater 45 is activated by the main ECU 80. In addition, as shown in FIG. 9, the control of the camera heater 45 according to each of the embodiments can be applied to a case that the deicer 40 is not provided at the front glass 101.

Figure 9:
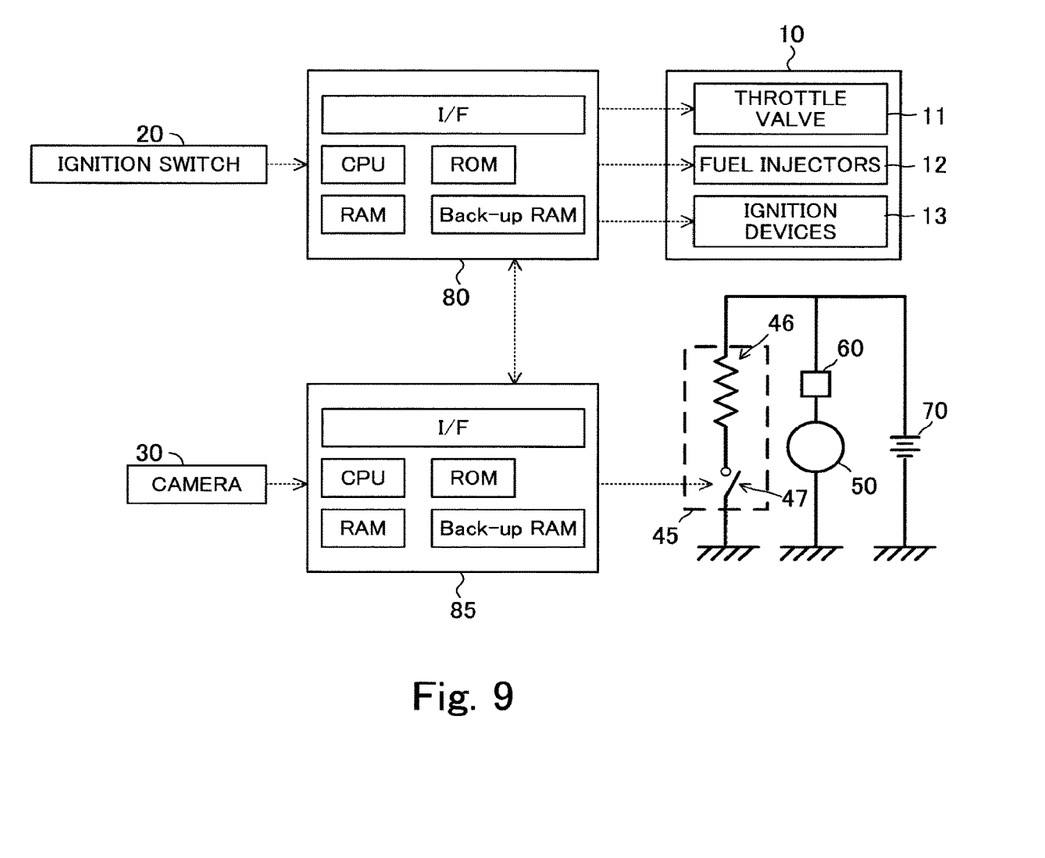
FIG. 9 is a view for showing another system, to which the present invention can be applied.

As shown in FIG. 9, when the deicer 40 is not provided at the front glass 101, the heater electric heating wire 46 may be provided at the portion 101a of the front glass 101 in front of the camera 30 or a portion of the front glass 101 around the portion 101a.

When the camera 30 is provided in the interior of the vehicle 100 such that the camera 30 takes images of the outside of the vehicle 100 from the interior of the vehicle 100 through a rear window glass provided at a rearward portion of the vehicle 100, the heater 45 may be a heater for heating a portion of the rear glass in front of the camera 30. Further, when the camera 30 is provided in the interior of the vehicle 100 such that the camera 30 takes images of the outside of the vehicle 100 from the interior of the vehicle 100 through a side window glass provided at a side portion of the vehicle 100, the heater 45 may be a heater for heating a portion of the rear glass in front of the camera 30.

The camera heater 45 may be a heater having a switch operated by a user of the vehicle 100. In this case, when the switch of the heater 45 is set at an ON-position by the user of the vehicle 100, the energization permission condition becomes satisfied and when the switch of the heater 45 is set at an OFF-position by the user of the vehicle 100, the energization permission condition becomes unsatisfied.

Further, the camera heater 45 may be configured such that the electricity is supplied from the battery 70 to the heater electric heating wire 46 when the heater circuit switch 47 is set at the ON-position.

Furthermore, the vehicle 100 may be a vehicle configured to execute an engine operation control for stopping the operation of the engine 10 when a predetermined engine operation stop condition (for example, a condition that the brake pedal is operated and the traveling speed of the vehicle becomes zero) is satisfied during the operation of the engine 10 and restarting the operation of the engine 10 when a predetermined engine operation restart condition (for example, a condition that the ignition switch 20 is set at the ON-position and the acceleration pedal is operated) becomes satisfied during the stop of the operation of the engine 10. In this case, the energization permission condition may become satisfied when the operation of the engine 10 is restarted by the engine operation control. On the other hand, the energization permission condition may become unsatisfied when the operation of the engine 10 is stopped by the engine operation control.

Further, the vehicle 100 may be a vehicle having the internal combustion engine and an electric motor as a driving source of the vehicle (i.e., a hybrid vehicle). Alternatively, the vehicle 100 may be a vehicle only having the electric motor as the driving source of the vehicle without the internal combustion engine (I.e., an electric vehicle).

What is claimed is:

1. A window glass heating apparatus, comprising:
   an electric heating wire to heat a window glass of a vehicle; and
   a controller configured to control energization of the electric heating wire,
   the controller being configured:
      to start the energization of the electric heating wire while an energization permission condition to permit the energization of the electric heating wire is satisfied;
      to stop the energization of the electric heating wire when a predetermined energization continuation time has elapsed after starting the energization of the electric heating wire while the energization permission condition is satisfied; and
      to stop the energization of the electric heating wire when the energization permission condition becomes unsatisfied even before the predetermined energization continuation time has elapsed after the energization of the electric heating wire is started,
   wherein the controller is configured:
      to continue to stop the energization of the electric heating wire until a predetermined energization standby time has elapsed after the energization permission condition becomes satisfied; and
      to start the energization of the electric heating wire when the predetermined energization standby time has elapsed after the energization permission condition becomes satisfied.

2. The window glass heating apparatus according to claim 1, wherein the controller is configured:
   to acquire an energization stop time elapsing until the energization permission condition becomes satisfied after the energization of the electric heating wire is stopped; and
   to set the predetermined energization standby time such that the predetermined energization standby time decreases as the energization stop time increases.

3. The window glass heating apparatus according to claim 1, wherein the controller is configured:
   to perform a start of the energization of the electric heating wire for the predetermined energization continuation time when the predetermined energization standby time has elapsed after the energization permission condition becomes satisfied;
   to perform a stop of the energization of the electric heating wire for a predetermined energization stop time when the predetermined energization continuation time has elapsed after performing the start of the energization of the electric heating wire; and
   to alternately repeatedly perform the start and the stop of the energization of the electric heating wire.

4. The window glass heating apparatus according to claim 1, wherein the vehicle comprises a camera which takes images of an outside of the vehicle from an interior of the vehicle through the window glass, and the electric heating wire is provided such that the electric heating wire heats a portion of the window glass in front of the camera.

5. The window glass heating apparatus according to claim 4, wherein the vehicle comprises a deicer to heat an entirety of the window glass,
   the camera is supported on the vehicle by a support member, and
   the electric heating wire is mounted on the support member such that the electric heating wire heats a closed space defined by the support member, the camera and the window glass.

6. The window glass heating apparatus according to claim 1, wherein the vehicle comprises a vehicle starting switch to selectively set the vehicle at any of a vehicle travel state that the vehicle can travel and a vehicle non-travel state that the vehicle cannot travel, the vehicle starting switch being operated by a user of the vehicle, and
   the energization permission condition becomes satisfied when the vehicle starting switch is operated to set the vehicle at the vehicle travel state and the energization permission condition becomes unsatisfied when the vehicle starting switch is operated to set the vehicle at the vehicle non-travel state.

7. The window glass heating apparatus according to claim 1, wherein the vehicle comprises an internal combustion engine as a driving source to drive the vehicle,
   the controller is configured to execute an engine operation control for:
      stopping an operation of the internal combustion engine when a predetermined engine operation stop condition becomes satisfied while the internal combustion engine is operated; and
      restarting the operation of the internal combustion engine when a predetermined engine operation restart condition becomes satisfied while the operation of the internal combustion engine is stopped, and
   the energization permission condition becomes satisfied when the operation of the internal combustion engine is restarted by the engine operation control and the energization permission condition becomes unsatisfied when the operation of the internal combustion engine is stopped by the engine operation control.

\* \* \* \* \*